(12) United States Patent
Niitsuma et al.

(10) Patent No.: US 11,819,012 B2
(45) Date of Patent: Nov. 21, 2023

(54) SPINNING REEL

(71) Applicant: Shimano Inc., Osaka (JP)

(72) Inventors: Akira Niitsuma, Osaka (JP); Atsushi Kawamata, Osaka (JP); Shu Kusuda, Osaka (JP); Kei Saito, Osaka (JP); Hirokazu Hirayama, Osaka (JP); Satoshi Ikebukuro, Osaka (JP); Yoshiyuki Takemoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/874,862

(22) Filed: Jul. 27, 2022

(65) Prior Publication Data

US 2023/0122536 A1    Apr. 20, 2023

(30) Foreign Application Priority Data

Oct. 15, 2021 (JP) ................. 2021-169682

(51) Int. Cl.
    *A01K 89/01* (2006.01)
(52) U.S. Cl.
    CPC ................... *A01K 89/0111* (2013.01)
(58) Field of Classification Search
    CPC ... A01K 89/0111; A01K 89/028; A01K 89/03
    See application file for complete search history.

(56) References Cited

U.S. PATENT DOCUMENTS

| | | | |
|---|---|---|---|
| 9,480,246 B1 * | 11/2016 | Carlebach | A01K 89/0113 |
| 2019/0191684 A1 * | 6/2019 | Saito | A01K 89/027 |
| 2019/0230908 A1 * | 8/2019 | Saito | A01K 89/01121 |

FOREIGN PATENT DOCUMENTS

| | | | | |
|---|---|---|---|---|
| EP | 1712127 A1 * | 10/2006 | | A01K 89/0111 |
| EP | 2939535 A1 * | 11/2015 | | A01K 89/0111 |
| EP | 2880975 B1 * | 1/2018 | | A01K 89/0111 |
| JP | 2019-129750 A | 8/2019 | | |
| KR | 20070056909 A * | 6/2007 | | A01K 89/0111 |

* cited by examiner

*Primary Examiner* — Emmanuel M Marcelo
(74) *Attorney, Agent, or Firm* — Global IP Counselors, LLP

(57) ABSTRACT

A spinning reel has a reel body, a spool shaft, a spool, a spool ring, and a drag knob. The spool ring is disposed on the external radial portion of a front flange of the spool. The drag knob is disposed in front of the spool shaft. As seen from the outside of the spool ring in the radial direction, an angle formed by a tangent line, which passes through a contact point between an external radial portion and a spherical boundary and which is tangent to the spherical boundary, and a straight line, which is orthogonal to the spool shaft and which passes through the contact point, is less than or equal to degrees. The drag knob is disposed inside the spherical boundary.

7 Claims, 6 Drawing Sheets

SPINNING REEL

CROSS-REFERENCE TO RELATED APPLICATIONS

This application claims priority to Japanese Patent Application No. 2021-169682, filed on Oct. 15, 2021. The entire disclosure of Japanese Patent Application No. 2021-169682 are hereby incorporated by reference.

BACKGROUND

Field of the Invention

The present disclosure relates to a spinning reel.

Background Art

A conventional spinning reel generally includes a reel body, a spool shaft, a spool, and a drag knob (refer to Japanese Laid-Open Patent Application No. 2019-129750). The drag knob is positioned in front of the spool shaft. The knob portion of the drag knob projects forward from the front flange of the spool.

SUMMARY

In general, in a spinning reel, the bail arm is folded down to position the bail in front of the drag knob. The handle is rotated in this state in order to wind the fishing line about the spool.

It has been determined that in a conventional spinning reel, when the bail is positioned in front of the drag knob, the fishing line can extend from the edge of the front flange toward the front of the drag knob and become entangled in the knob portion of the drag knob. This problem tends to occur more readily with thinner and softer fishing lines, for example.

The object of the present disclosure is to provide a spinning reel that can suppress line entanglement in the drag knob.

The spinning reel according to one aspect of the present invention comprises a reel body, a spool shaft, a spool, a spool ring, and a drag knob. The spool shaft is supported to be movable in the forward-backward direction with respect to the reel body.

The spool is connected to the spool shaft. The spool has a bobbin trunk around the outer circumference of which a fishing line is wound and a front flange extends radially outward from the front end of the bobbin trunk. The spool ring is disposed on the outward side of the front flange in the radial direction. The drag knob is used to adjust the drag force of the spool. The drag knob is positioned in front of the spool shaft.

Here, the boundary of a partial sphere in contact with the outward edges of the spool ring in the radial direction is defined. As seen from the outside of the spool ring in the radial direction, the angle formed by a tangent line, which passes through the point of contact between the radially outward edge and the boundary of the partial sphere and which is tangent to the spherical boundary, and by a straight line, which is orthogonal to the spool axis and which passes through the aforementioned point of contact, is less than or equal to 45 degrees. The drag knob is disposed inside the spherical boundary.

In one embodiment of the spinning reel, the angle between the line tangent to the above-described boundary of the partial sphere and the above-described straight line is less than or equal to 45 degrees, and the drag knob is disposed inside the above-described spherical boundary, so that line entanglement with the drag knob can be suppressed.

The spinning reel according to another aspect of the present invention preferably further comprises a retaining ring for fixing the spool ring to the spool. In this case, the retaining ring is disposed inside the spherical boundary.

In the spinning reel according to another aspect of the present invention, a first edge portion formed on the radially outermost part of the spool ring is preferably arranged in front of a second edge portion formed on the radially outermost part of the front flange. In this case, the axial distance between the first edge portion and the second edge portion is greater than or equal to 2.0 mm.

In the spinning reel according to another aspect of the present invention, the drag knob preferably has an annular portion disposed in front of the spool shaft and a knob portion that projects forward from the annular portion. In this case, the knob portion extends along a plane that includes the center axis of the spool shaft. The knob portion has a pair of external surfaces formed on either side of the plane. Each pair of external surfaces has a curvature of 4.0 or more.

In a spinning reel according to another aspect of the present invention, the ratio of the outer diameter of the spool ring to the outer diameter of the annular portion is preferably 95% or less.

The spinning reel according to another aspect of the present invention preferably also comprises a retaining ring for fixing the spool ring to the spool. In this case, the axial distance between the front surface of the annular portion and the front surface of the retaining ring is greater than or equal to 0 mm and less than or equal to 0.5 mm.

In a spinning reel according to another aspect of the present invention, the outer surface of the radially outward portion preferably has a curvature of 0.3 or more.

By embodiments of the present invention, line entanglement with the drag knob of a spinning reel can be suppressed.

DETAILED DESCRIPTION OF EMBODIMENTS

Figure 1:
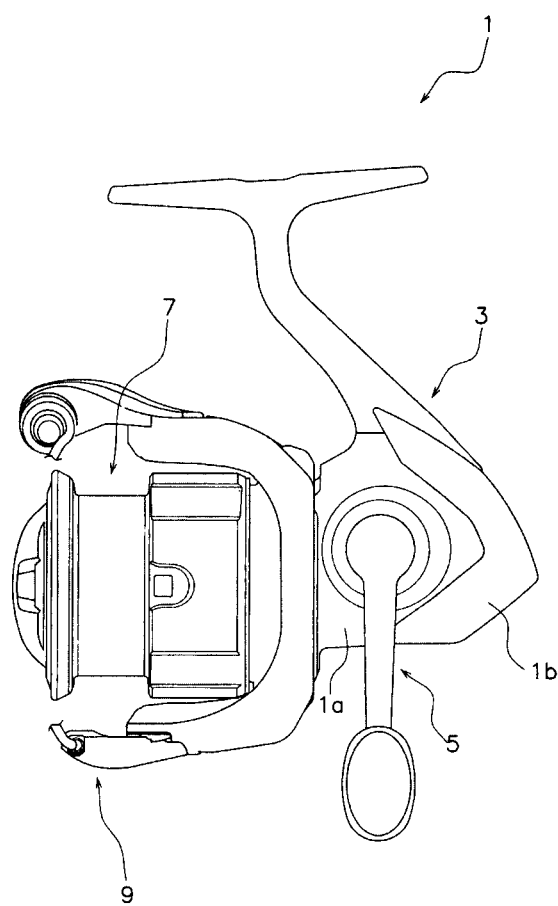
FIG. 1 is a side view of the spinning reel according to an embodiment of the present invention.
Figure 2:
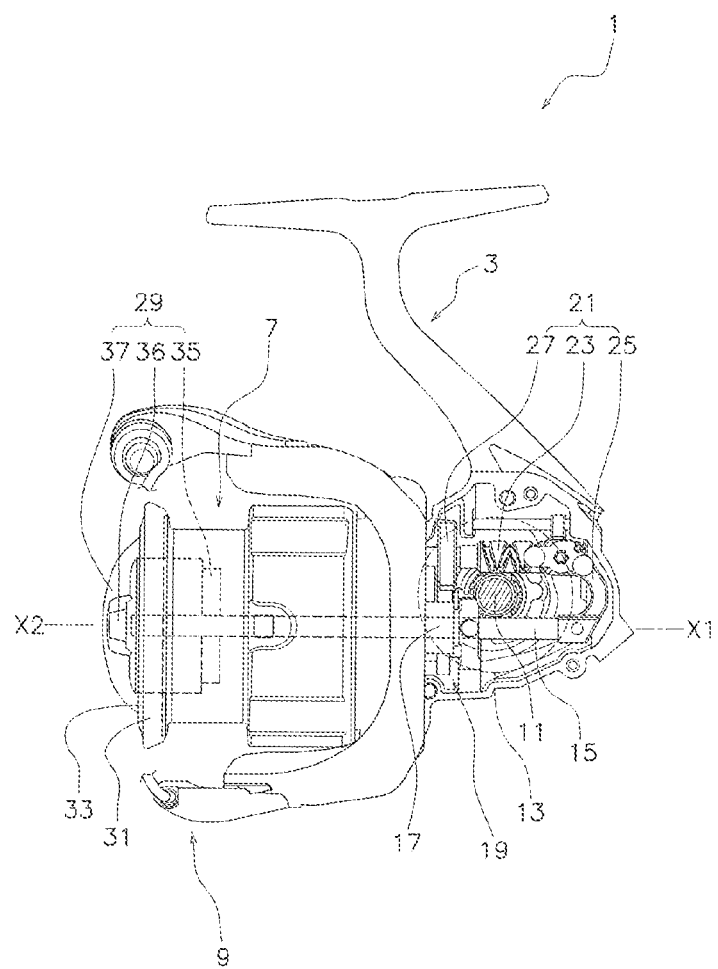
FIG. 2 is a side view of the spinning reel with the side cover and the main body guard removed.

As shown in FIG. 1, a spinning reel 1 in which one embodiment of the present invention is employed comprises a reel body 3, a handle 5, a spool 7, and a rotor 9. As shown in FIG. 2, the spinning reel 1 also comprises a handle shaft 11, a drive gear 13, a spool shaft 15, a pinion gear 17, an oscillating mechanism (oscillator) 21, and a drag mechanism 29. The spinning reel 1 further comprises a spool ring 31 and a retaining ring 33.

FIG. 2 shows the spinning reel 1a of FIG. 1 with side cover 1a and main body guard 1b removed.

As shown in FIG. 1, the handle 5 is supported by the reel body 3 so as to be rotatable. In the present embodiment, an example of a case in which the handle 5 is disposed on the left side of the reel body 3 is shown. The handle 5 can be disposed on the right side of the reel body 3. The handle 5 is mounted on the handle shaft 11.

As shown in FIG. 2, the handle shaft 11 is supported by the reel body 3 so as to be rotatable. The drive gear 13 is mounted on the handle shaft 11 so as to rotate integrally with the handle shaft 11. The drive gear 13 meshes with the pinion gear 17.

The spool shaft 15 is supported so as to be movable in a reciprocating fashion in a forward-backward direction with respect to the reel body 3. The spool shaft 15 is inserted through the inner circumferential portion of the pinion gear 17. The spool shaft 15 moves back and forth in reciprocating fashion with respect to the reel body 3 by the operation of the oscillating mechanism 21.

The spool shaft 15 has spool center axis X1. Spool axis X1 extends in the forward-backward direction. Unless otherwise specified, the axial direction is the direction of extension of spool axis X1. The radial direction is away from or transverse to the spool axis X1. The circumferential direction is the direction around spool axis X1.

Fishing line is wound around the spool 7. The spool 7 is configured to be movable in the forward-backward direction relative to the reel body 3 together with the spool shaft 15. The spool 7 is connected to the spool shaft 15. For example, the spool 7 is connected to the distal end portion of the spool shaft 15 via the drag mechanism 29. In the state in which the spool 7 is connected to the spool shaft 15, the center axis X2 of the spool 7 is coaxial with the spool axis X1.

Figure 3:
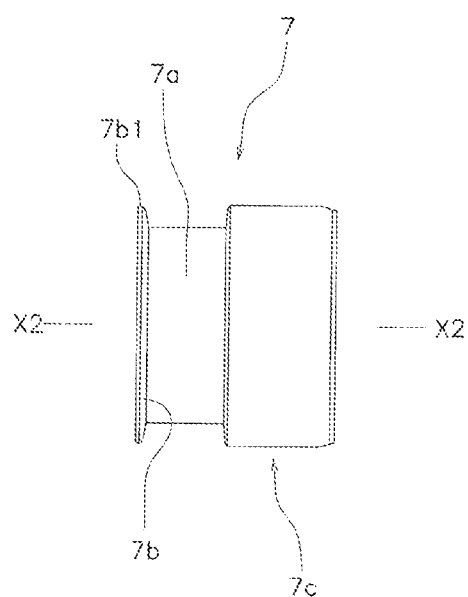
FIG. 3 is a side view of the spool.

As shown in FIG. 3, the spool 7 has a bobbin trunk 7a, a front flange 7b, and a skirt portion 7c. Fishing line is wound around the outer circumference of the bobbin trunk 7a. The bobbin trunk 7a is formed in a cylindrical shape, and the front flange 7b extends radially outwards from the front end of the bobbin trunk 7a. The front flange 7b is disk-shaped and integrally formed with the bobbin trunk 7a. The skirt portion 7c is integrally formed at the rear end of the bobbin trunk 7a.

Figure 4:
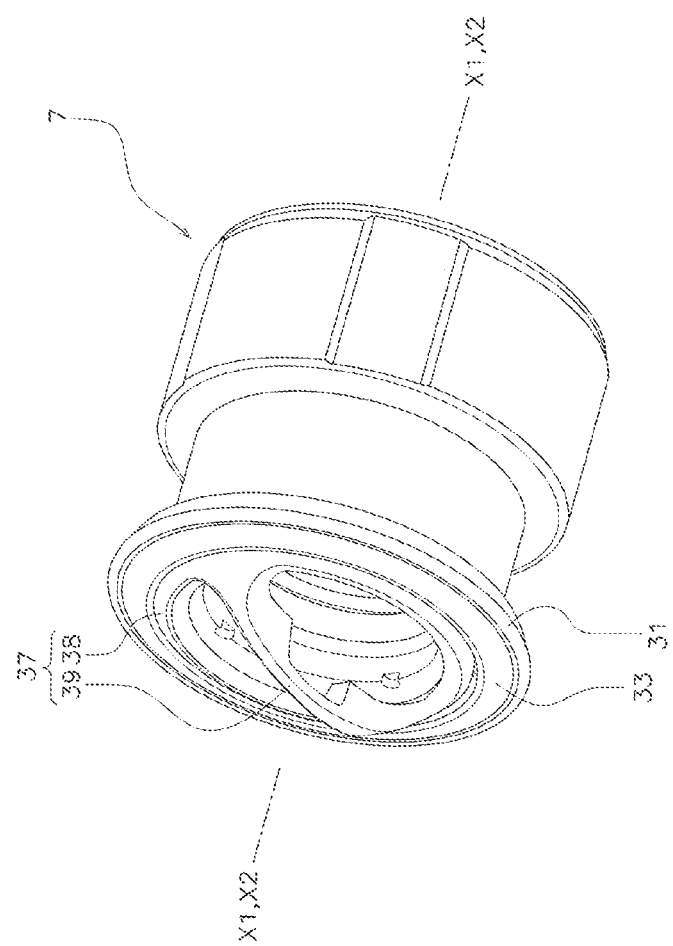
FIG. 4 is an oblique view of the spool, spool ring, retaining ring 33, and the drag knob.
Figure 5:
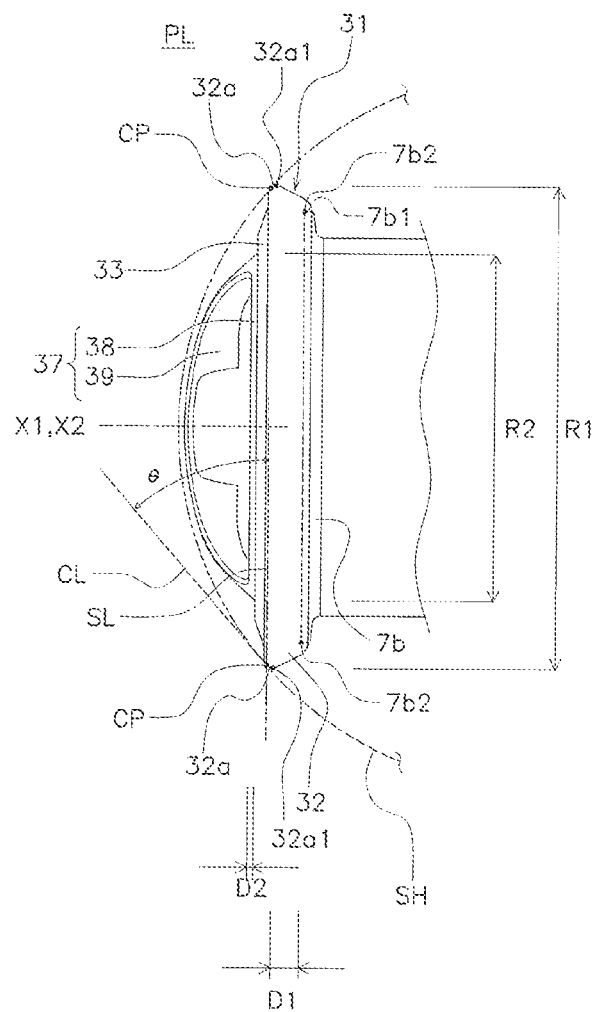
FIG. 5 is a side view of the spool, spool ring, retaining ring 33, and the drag knob.

As shown in FIGS. 4 and 5, the spool ring 31 is disposed in front of the spool 7. As shown in FIG. 5, the spool ring 31 is disposed between the front flange 7b and the retaining ring 33 in the axial direction. The spool ring 31 is disposed radially outward of the front flange 7b. The spool ring covers the outer circumferential surface 7b1 of the front flange 7b. In FIG. 5, the portion where the spool ring 31 covers the front flange 7b is indicated by the dashed line.

As shown in FIGS. 4 and 5, the retaining ring 33 is used to fix the spool ring 31 to the spool 7. As shown in FIG. 5, the retaining ring 33 is disposed in front of the front flange 7b. The retaining ring 33 is disposed on the inner side of the spool ring 31 in the radial direction. The retaining ring 33 is disposed between a drag knob (drag controller) 37 and the spool ring 31 in the axial direction.

As shown in FIG. 2, the oscillating mechanism 21 is interlinked with the rotation of the handle shaft 11 to move the spool shaft 15 in the forward-backward direction. The oscillating mechanism 21 is disposed in the interior space of the reel body 3. The oscillating mechanism 21 comprises a worm shaft 23, a slider 25, and a worm shaft gear 27.

The worm shaft 23 rotates to move the spool shaft 15 and the slider 25 back and forth. The worm shaft 23 is disposed parallel to the spool shaft 15, and is supported by the reel body 3 so as to be rotatable.

The slider 25 is mounted on the spool shaft 15. For example, the slider 25 is fixed to the rear end of the spool shaft 15. The slider 25 moves in the forward-backward direction by the rotation of the worm shaft 23. For example, the slider 25 moves back and forth with the rotation of the worm shaft 23 via a pawl member, not shown.

The worm shaft gear 27 is mounted on the end portion of the worm shaft 23. The worm shaft gear 27 integrally rotates with the worm shaft 23. The worm shaft gear 27 rotates in conjunction with the rotation of the pinion gear 17. For example, the worm shaft gear 27 rotates in conjunction with the rotation of the pinion gear 17 via a reduction mechanism 19 disposed between the pinion gear 17 and the worm shaft gear 27.

The pinion gear 17 is formed in a cylindrical shape, and is supported by the reel body 3 so as to be rotatable. The pinion gear 17 is disposed on the radially outward side of the spool shaft 15. The pinion gear 17 rotates with respect to the spool shaft 15, and about spool axis X1.

As shown in FIGS. 1 and 2, the rotor 9 is used to wind fishing line around the spool 7. The rotor 9 is located at the front portion of the reel body 3. The rotor 9 is configured to rotate with respect to the reel body 3. The rotor 9 is disposed radially outward of the pinion gear 17, and is mounted so as to be integrally rotatable with respect to the pinion gear 17.

When the handle shaft 11 rotates by rotary operation of the handle 5, the drive gear 13 rotates. The rotation of the drive gear 13 is transmitted to the pinion gear 17. The rotor 9 rotates in conjunction with the rotation of the pinion gear 17. In this way, fishing line is wound around the spool 7, for example, the bobbin trunk 7a.

The drag mechanism 29 brakes the rotation of the spool 7. For example, the drag mechanism 29 applies a drag force to the spool 7. As shown in FIG. 2, the drag mechanism 29 is disposed on the inner circumferential portion of the spool 7, for example, the inner circumferential portion of the bobbin trunk 7a, radially outward of the spool shaft 15.

The drag mechanism 29 includes a friction part 35, an intermediate member 36, and the drag knob 37. The friction part 35 is disposed between the drag knob 37 and the spool 7 in the axial direction. Specifically, the friction part 35 is disposed between the intermediate member 36 and the spool 7 in the axial direction, radially outward of the spool shaft 15.

The friction part 35 includes a plurality of friction disks, not shown. At least one of the plurality of friction disks is locked to the spool 7. The friction part 35 is pressed by the drag knob 37. For example, the friction part 35 is pressed by the drag knob 37 via the intermediate member 36.

The intermediate member 36 is attached to the distal end of the spool shaft 15. The intermediate member 36 is disposed in front of the friction part 35. The intermediate member 36 is disposed between the friction part 35 and the drag knob 37 in the axial direction. The intermediate member 36 presses the friction part 35. For example, when the drag knob 37 rotates, the intermediate member 36 moves toward the friction part 35 and presses the friction part 35.

The drag knob 37 is used to adjust the drag force of the spool 7. The drag knob 37 is disposed in front of the spool shaft 15. Specifically, the drag knob 37 is disposed in front of the intermediate member 36.

Figure 6:
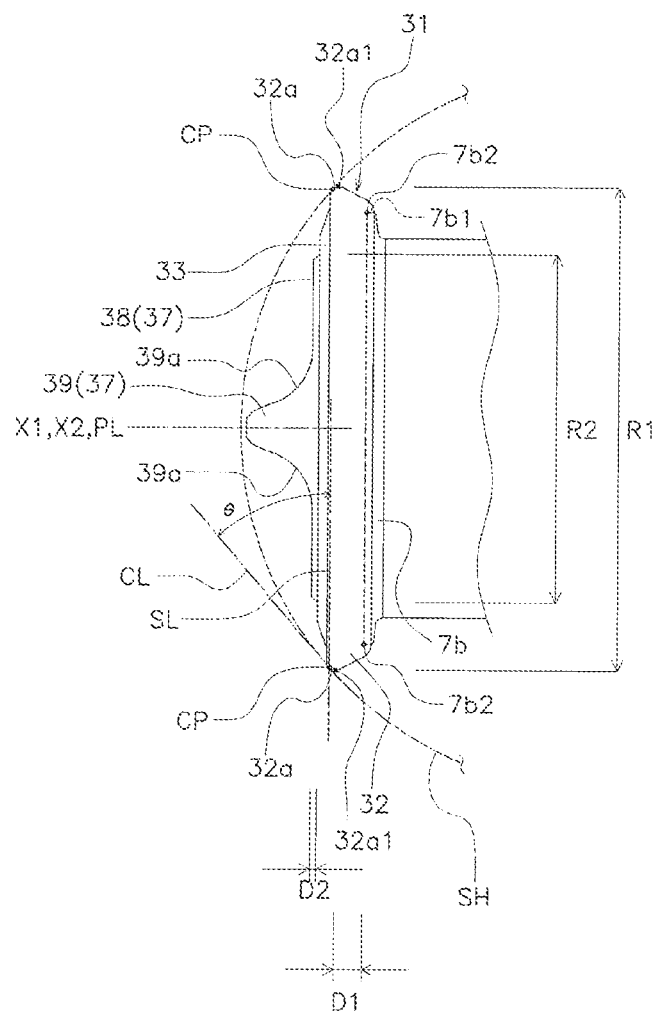
FIG. 6 is a side view of the spool, spool ring, retaining ring 33, and the drag knob.

As shown in FIGS. 4, 5, and 6, the drag knob 37 includes an annular portion 38 and a knob portion 39. The annular portion 38 is disposed in front of the spool shaft 15. The annular portion 38 is disposed in front of the intermediate member 36 (see FIG. 2). The annular portion 38 engages the intermediate member 36 and rotates integrally with the intermediate member 36.

The knob portion 39 projects forward from the annular portion 38. The knob portion 39 can be integrally formed with the annular portion 38. For example, as shown in FIG. 5, the knob portion 39 extends along a plane PL that includes spool axis X1. Specifically, the knob portion 39 extends forward from the front surface of the annular portion 38 while curving on the plane PL that includes spool axis X1.

By rotating the knob portion 39, the annular portion 38 presses the intermediate member 36 toward the friction part 35. The intermediate member 36 moves toward the friction part 35 and presses the friction part 35. In this way, a drag force acts on the spool 7.

The spool ring 31, the retaining ring 33, and the drag knob 37 shown in FIG. 4 are configured as follows. In the spool ring 31 shown in FIGS. 5 and 6, the spherical boundary SH in contact with the external radial portion 32 of the spool ring 31 is defined. The drag knob 37 is disposed inside the spherical boundary SH. The retaining ring 33 is disposed inside the spherical boundary SH.

As seen from the outside of the spool ring 31 in the radial direction, the angle θ formed between a tangent line CL, which passes through the contact point CP between the external radial portion 32 and the spherical boundary SH and which is tangent to the spherical boundary SH, and a straight line SL, which is orthogonal to the spool shaft 15 and which passes through the contact point CP, is less than or equal to 45 degrees.

In FIGS. 5 and 6, the angle θ described above is indicated only with respect to one contact point CP of two contact points CP. The straight line SL corresponds to the straight line that is formed by the plane that is orthogonal to the spool shaft 15 and that passes through the contact points CP when the spool ring 31 is seen from the outside in the radial direction.

As shown in FIGS. 5 and 6, the spool ring 31 has an external diameter R1. The external diameter R1 of the spool ring 31 is defined by a first edge portion 32a1 located on the outermost edge of the spool ring 31 in the radial direction. The first edge portion 32a1 is located on the outer circumferential surface 32a of the external radial portion 32 of the spool ring 31.

The annular portion 38 has external diameter R2. The external diameter R2 of the annular portion 38 is defined by the outermost part of the knob portion 39 located in the radial direction. The ratio of the external diameter R2 of the spool ring 31 to the external diameter R1 of the annular portion 38 is 95% or less.

The first edge portion 32a1 of the spool ring 31 is located in front of a second edge portion 7b2, which is on the outermost side of the front flange 7b in the radial direction. The second edge portion 7b2 is located on the outer circumferential surface 7b1 of the front flange 7b. For example, the second edge portion 7b2 is located on the outermost side of the front flange 7b in the radial direction.

The axial distance D1 between the first edge portion 32a1 of the spool ring 31 and the second edge portion 7b2 of the spool ring 31 is greater than or equal to 2.0 mm. The axial distance D2 between the front surface of the annular portion 38 and the front surface of the retaining ring 33 is greater than or equal to 0 mm and less than or equal to 0.5 mm.

The outer circumferential surface 32a of the external radial portion 32 of the spool ring 31 has a curvature of 0.3 or more. For example, the outer circumferential surface 32a of the external radial portion 32 of the spool ring 31 preferably has a curvature of 0.3 more and 1.5 or less.

As shown in FIG. 6, the knob portion 39 has a pair of external surfaces 39a that are provided on either side of plane PL. Each pair of external surfaces 39a has a curvature of 4.0 or more. For example, each pair external surfaces 39a has a curvature of 4.0 or more and 7.0 or less.

Embodiments of the present invention can be used in a spinning reel.

What is claimed is:

1. A spinning reel, comprising
a reel body;
a spool shaft movably supported to the reel body in a forward-backward direction reciprocally;
a spool connecting to the spool shaft and having a bobbin trunk which a fishing line is capable of being wound on thereof and a front flange radially, extending outward from a front end of the bobbin trunk;
a spool ring disposed on a radial outward side of the front flange; and
a drag knob configured to adjust a drag force against the spool and disposed in front of the spool shaft,
wherein a spherical boundary defined to contact an external radial portion of the spool ring,
a tangent line defined to tangent to the spherical boundary at a contact point of the external radial portion and the spherical boundary as seen from the radially outside of the spool ring,
an angle between the tangent line and a straight line that is orthogonal to the spool shaft, is less than or equal to 45 degrees, and
the drag knob disposed inside of the spherical boundary.

2. The spinning reel according to claim 1, further comprising
a retaining ring configured to retain the spool ring to the spool, the retaining ring is disposed inside the spherical boundary.

3. The spinning reel according to claim 1, wherein
the spool ring has a first edge portion located on a radially outermost side of the spool ring,
the flange has a second edge portion located on a radially outermost side of the front flange, and
wherein the first edge portion is disposed at an axially front side than the second edge portion, and an axial distance between the first edge portion and the second edge portion is greater than or equal to 2.0 mm.

4. The spinning reel according to claim 1, wherein
the drag knob has an annular portion disposed in front of the spool shaft and a knob portion projecting forward from the annular portion,
the knob portion extends along a plane that includes a center axis of the spool shaft and the knob portion has a pair of external surfaces on each side of the plane, and the pair of external surfaces has a curvature of 4.0 or more.

5. The spinning reel according to claim 4, wherein
a ratio of an external diameter of the annular portion to an external diameter of the spool ring is 95% or less.

6. The spinning reel according to claim 5, further comprising
a retaining ring configured to retain the spool ring to the spool, an axial distance between a front surface of the annular portion and a front surface of the retaining ring is greater than or equal to 0 mm and less than or equal to 0.5 mm.

7. The spinning reel according to claim 1, wherein an outer surface of the external radial portion has a curvature of 0.3 or more.

* * * * *